United States Patent Office 3,085,894
Patented Apr. 16, 1963

3,085,894
PAPER COATING PIGMENTS
Ben W. Rowland, Elizabeth, N.J., assignor to Georgia Kaolin Company, Elizabeth, N.J.
No Drawing. Filed June 28, 1961, Ser. No. 120,195
11 Claims. (Cl. 106—306)

This invention relates to paper coating pigments and more particularly to a paper coating pigment having unusual properties of brightness, gloss and opacity. This application is a continuation-in-part of my co-pending application Serial No. 775,355, filed November 21, 1958, which issued on July 18, 1961 as Patent No. 2,992,936.

Large amounts of kaolin and calcium carbonate are used in the coating of paper to produce a high quality surface for printing. The qualities of brightness, gloss and opacity are of prime importance in such coating clays. These qualities have in the past been achieved primarily by selection of natural kaolin crudes which impart these particular properties. However, it is increasingly difficult to find natural kaolin deposits which will inherently have these characteristics as well as the necessary qualities of ink absorption and viscosity for paper coating.

I have discovered a paper coating pigment which will produce substantial improvements in gloss, brightness and opacity as compared to these properties hitherto attainable with any given kaolin crude.

I have found that by selecting from naturally occurring kaolin clay a fraction made up of clay particles of several size ranges with specific concentrations and combining this with calcium carbonate of an average particle size (average spherical diameter) between about 0.1 and 0.5 micron I can produce a coating of surprising brightness, gloss and opacity. Such a pigment will produce these characteristics to a greater degree than any heretofore available from a given kaolin crude. I have found that not only is my invention applicable to the improvement of lower quality clays but that by applying my invention to the best coating clays heretofore produced I can obtain a significantly improved product.

My invention will be perhaps best explained by reference to the following examples showing preferred practices of my invention.

Example

A coating clay was produced by separating from a natural crude kaolin by centrifuging and sedimentation a clay composition having the following particle size consisting of:

99.5% by wt. less than 5 microns equivalent spherical diameter
89% by wt. less than 1.7 microns equivalent spherical diameter
75% by wt. less than 1 micron equivalent spherical diameter
33% by wt. less than 0.5 micron equivalent spherical diameter
14% by wt. less than 0.3 micron equivalent spherical diameter Fourteen (14) ream weight coatings were made with this clay and with a high quality commercial coating clay, employing 14% Superfilm No. 4 starch on clay. Coatings were calendered and tested as follows:

| Commercial | Coat wt. | Brightness | Standard Opacity | Percent Gloss | Wax Test | Ink Receptivity |
|---|---|---|---|---|---|---|
| Control | 14.3 | 72.6 | 91.82 | 60.6 | 5 | 46.5 |
| Selected Clay | 14.6 | 73.9 | 92.30 | 63.0 | 5 | 43.8 |

I then admixed the two clays with 30% of 0.3 micron M grade, Wyandotte calcium carbonate with the following results.

| | Coat wt. | Brightness | Standard Opacity | Percent Gloss | Wax Pick | Ink Receptivity |
|---|---|---|---|---|---|---|
| Control plus 30% carbonate | 15.9 | 74.5 | 89.93 | 50.4 | 5 | 43.0 |
| Selected clay plus 30% carbonate | 14.2 | 75.4 | 92.13 | 53.2 | 5 | 39.8 |

Comparing these data with those for coatings of the two clays without carbonate, it is found that: with the control, brightness gain due to carbonate is 1.9% and opacity loss is 1.89%, whereas with the selected clay brightness gain due to carbonate is 1.5% and opacity loss is only 0.17%. This gives the combination of selected clay with carbonate an advantage over the control with carbonate as follows:

Brightness _____ 0.9%
Opacity _____ 2.2%
Gloss _____ 2.8%, with equal pick test.

and better ink receptivity. These are really large improvements. The coating weight on the control being 12% heavier than for the composition of my invention makes these improvements appear even greater.

Further experiments have confirmed these results and show that a kaolin clay having the following size composition combined with about 10% to 50% of calcium carbonate of 0.1 to 0.5 micron equivalent spherical diameter will consistently show these improved characteristics of brightness, gloss and opacity over the best grades of commercial coating clay.

99–100% by wt. less than 5 microns equivalent spherical diameter
98–100% by wt. less than 4 microns equivalent spherical diameter
88–100% by wt. less than 1.7 microns equivalent spherical diameter
85–97% by wt. less than 1.5 microns equivalent spherical diameter
70–84% by wt. less than 1.0 micron equivalent spherical diameter
25–37% by wt. less than 0.5 micron equivalent spherical diameter
10–15% by wt. less than 0.3 micron equivalent spherical diameter Similar results are achieved by combination of the selected clay with other coating pigments such as titanium dioxide and conventional coating clays.

My researches have shown that the equivalent spherical diameter of 1.7 microns is for some reason the upper limit of the optimum size and the greater the percentage under this particle size the better the product so long as the ranges beneath this particular size remain within the limits set out herein. Variations outside of these limits cause marked degradation of the product in one or more of the qualities of coating brightness, coating gloss, opacity or ink absorption.

While I have set out certain preferred embodiments and practices of my invention it will be understood that my invention may be otherwise embodied within the scope of the following claims.

I claim:
1. A coating pigment of improved coated brightness, gloss and opacity consisting essentially of about 50% to 90% clay particles within the size ranges about 99 to 100% by weight of particles less than 5 microns in aver- age spherical diameter, about 98 to 100% by weight of particles less than 4 microns in average spherical diameter, about 88% to 100% by weight of particles less than 1.7 microns in average spherical diameter, about 85% to 97% by weight of particles less than 1.5 microns in average spherical diameter, about 70% to 84% of particles less than 1 micron in average spherical diameter, about 25% to 37% of particles below 0.5 micron in average spherical diameter and about 10% to 15% of particles below 0.3 micron in average spherical diameter, and about 10% to 50% of calcium carbonate between 0.1 to 0.5 micron in average spherical diameter.

2. A coating pigment of improved coated brightness, gloss and opacity consisting essentially of bleached clay particles within the size ranges about 99 to 100% by weight of particles less than 5 microns in average spherical diameter, about 98 to 100% by weight of particles less than 4 microns in average spherical diameter, about 88% to 100% by weight of particles less than 1.7 microns in average spherical diameter, about 85% to 90% by weight of particles less than 1.5 microns in average spherical diameter, about 70% to 84% of particles less than 1 micron in average spherical diameter, about 25% to 37% of particles below 0.5 micron in average spherical diameter and about 10% to 15% of particles below 0.3 micron in average spherical diameter, and about 10% to 50% of calcium carbonate between 0.1 and 0.5 micron in average spherical diameter.

3. A coating pigment of improved coated brightness, gloss and opacity consisting essentially of clay particles within the size ranges about 88% to 100% by weight of particles less than 1.7 microns in average spherical diameter, about 85% to 90% by weight of particles less than 1.5 microns in average spherical diameter, about 70% to 84% of particles less than 1 micron in average spherical diameter, about 25% to 37% of particles below 0.5 micron in average spherical diameter and about 10% to 15% of particles below 0.3 micron in average spherical diameter wherein the portion present above 1.7 microns comprises about 99 to 100% by weight below 5 microns equivalent spherical diameter and 98 to 100% by weight less than 4 microns equivalent spherical diameter, said particles all having been subjected to a hydrosulfite bleach, and about 10% to 50% of calcium carbonate between 0.1 and 0.5 micron in average spherical diameter.

4. A coating pigment of improved coated brightness, gloss and opacity consisting essentially of clay particles within the size ranges about 99% by weight less than 5 microns average spherical diameter, about 89% by weight less than 1.7 microns average spherical diameter, about 75% by weight less than 1 micron average spherical diameter, about 32% by weight less than 0.5 micron average spherical diameter, about 11% by weight less than 0.3 micron average spherical diameter and about 30% of calcium carbonate having an average spherical diameter of 0.3 micron.

5. A coating clay of improved coated brightness, gloss and opacity consisting essentially of clay particles within the size ranges about 99% by weight less than 5 microns average spherical diameter, about 89% by weight less than 1.7 microns average spherical diameter, about 75% by weight less than 1 micron average spherical diameter, about 32% by weight less than 0.5 micron average spherical diameter and about 11% by weight less than 0.3 micron average spherical diameter, all of said particles having been subjected to a hydrosulfite bleach and about 30% of calcium carbonate having an average spherical diameter of 0.3 micron.

6. A coated paper carrying on a surface thereof a coating of a composition consisting essentially of about 50% to 90% clay particles within the size ranges about 99 to 100% by weight of particles less than 5 microns in average spherical diameter, about 98 to 100% by weight of particles less than 4 microns in average spherical diameter, about 88% to 100% by weight of particles less than 1.7 microns in average spherical diameter, about 85% to 97% by weight of particles less than 1.5 microns in average spherical diameter, about 70% to 84% of particles less than 1 micron in average spherical diameter, about 25% to 37% of particles below 0.5 micron in average spherical diameter and about 10% to 15% of particles below 0.3 micron in average spherical diameter, and about 10% to 50% of calcium carbonate between 0.1 to 0.5 micron in average spherical diameter.

7. A coated paper carrying on a surface thereof a coating of a composition consisting essentially of clay particles within the size ranges about 99 to 100% by weight of particles less than 5 microns in average spherical diameter, about 98 to 100% by weight of particles less than 4 microns in average spherical diameter, about 88% to 100% by weight of particles less than 1.7 microns in average spherical diameter, about 85% to 90% by weight of particles less than 1.5 microns in average spherical diameter, about 70% to 84% of particles less than 1 micron in average spherical diameter, about 25% to 37% of particles below 0.5 micron in average spherical diameter and about 10% to 15% of particles below 0.3 micron in average spherical diameter wherein the portion present above 1.7 microns comprises about 99% to 100% by weight below 5 microns equivalent spherical diameter and 98 to 100% by weight less than 4 microns equivalent spherical diameter, said particles all having been subjected to a hydrosulfite bleach, and about 10% to 50% of calcium carbonate between 0.1 and 0.5 micron in average spherical diameter.

8. A coated paper carrying on a surface thereof a coating of a composition consisting essentially of clay particles within the size ranges about 99% by weight less than 5 microns average spherical diameter, about 89% by weight less than 1.7 microns average spherical diameter, about 75% by weight less than 1 micron average spherical diameter, about 32% by weight less than 0.5 micron average spherical diameter, about 11% by weight less than 0.3 micron average spherical diameter and about 30% of calcium carbonate having an average spherical diameter of 0.3 micron.

9. A coated paper carrying on a surface thereof a coating of a composition consisting essentially of clay particles within the size ranges about 99% by weight less than 5 microns average spherical diameter, about 89% by weight less than 1.7 microns average spherical diameter, about 75% by weight less than 1 micron average spherical diameter, about 32% by weight less than 0.5 micron average spherical diameter and about 11% by weight less than 0.3 micron average spherical diameter, all of said particles having been subjected to a hydrosulfite bleach and about 30% of calcium carbonate having an average spherical diameter of 0.3 micron.

10. A coating pigment of improved coated brightness, gloss and opacity consisting essentially of about 50% to 90% clay particles within the size ranges about 99 to 100% by weight of particles less than 5 microns in average spherical diameter, about 98 to 100% by weight of particles less than 4 microns in average spherical diameter, about 88% to 100% by weight of particles less than 1.7 microns in average spherical diameter, about 85% to 97% by weight of particles less than 1.5 microns in average spherical diameter, about 70% to 84% of particles less than 1 micron in average spherical diameter, about 25% to 37% of particles below 0.5 micron in average spherical diameter and about 10% to 15% of particles below 0.3 micron in average spherical diameter, and about 10% to 50% of another coating pigment having an average equivalent spherical diameter of 0.3 micron.

11. A coated paper carrying on a surface thereof a coating of a composition consisting essentially of about 50% to 90% clay particles within the size ranges about 99 to 100% by weight of particles less than 5 microns in average spherical diameter, about 98 to 100% by weight of particles less than 4 microns in average spherical diameter, about 88% to 100% by weight of particles less than 1.7 microns in average spherical diameter, about 85% to 97% by weight of particles less than 1.5 microns in average spherical diameter, about 70% to 84% of particles less than 1 micron in average spherical diameter, about 25% to 37% of particles below 0.5 micron in average spherical diameter and about 10% to 15% of particles below 0.3 micron in average spherical diameter, and about 10% to 50% of another coating pigment having an average equivalent spherical diameter of 0.3 micron.

References Cited in the file of this patent

UNITED STATES PATENTS

| | | |
|---|---|---|
| 2,158,987 | Maloney | May 16, 1939 |
| 2,255,371 | Williams et al. | Sept. 9, 1941 |
| 2,955,051 | Maloney | Oct. 4, 1960 |

OTHER REFERENCES

Huber Corp., "Kaolin Clays and Their Industrial Uses" (1949), pages 109 and 111.